United States Patent Office 2,950,000
Patented Aug. 23, 1960

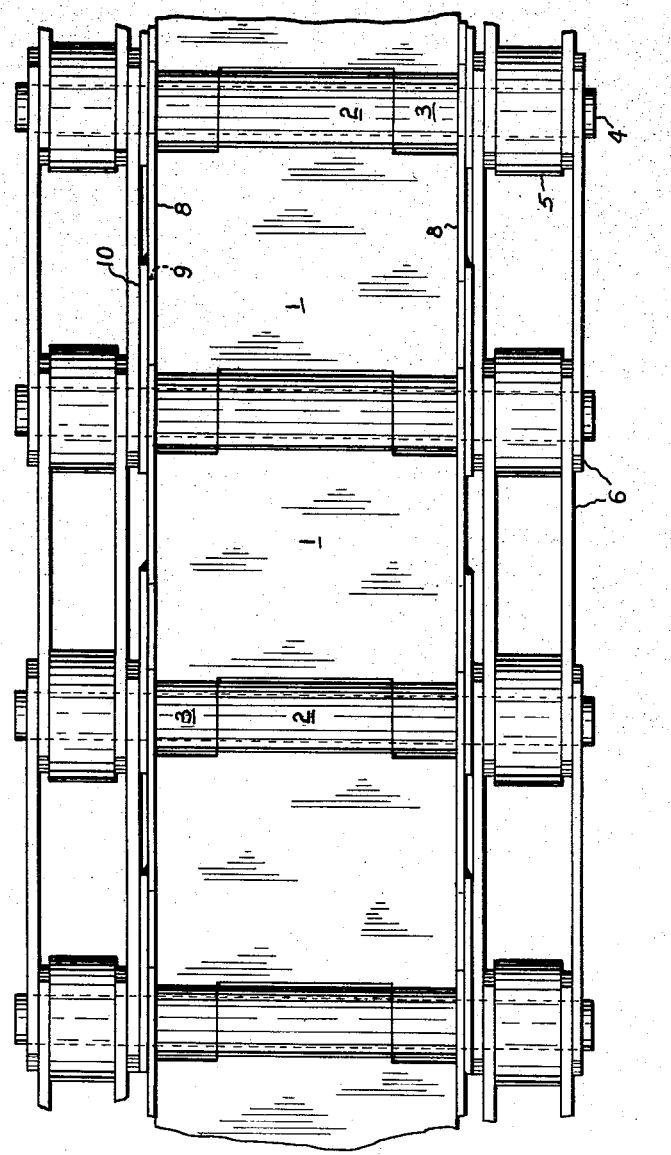

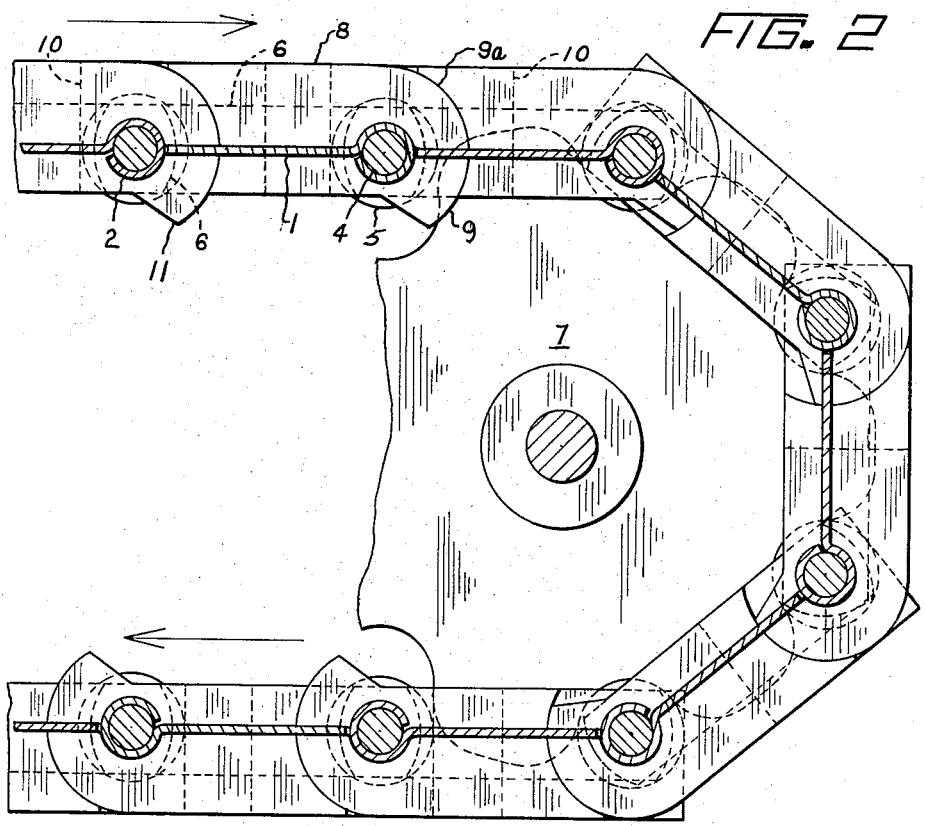
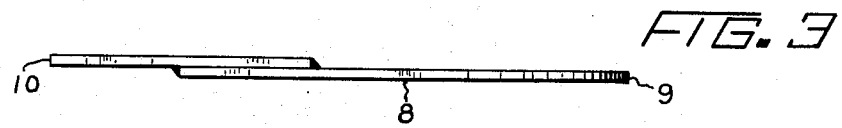
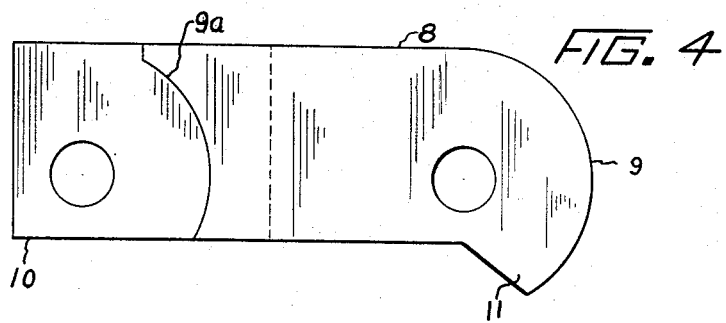

2,950,000

ENDLESS CONVEYOR WITH ARTICULATING SIDEWALLS

Charles F. Rivers, Detroit, Mich., assignor to Industrial Metal Fabricators Company, Detroit, Mich., a corporation of Michigan Filed Oct. 6, 1958, Ser. No. 765,377

2 Claims. (Cl. 198—196)

This invention relates to side walls for endless flexible conveyors and particularly to side walls comprised of a series of overlapping plates adapted to the flexibility of said conveyors.

An extremely troublesome problem in prior constructions is the undesired and destructive intrusion between the lapping portions of the side wall plates of parts or particles of material being conveyed. Such material may include sharp pointed objects in various stages of machining, or scrap metal having sharp corners and edges which engage between the lapping portions. This intrusion results in lateral bending, distortion and separation of said portions, which defects are rapidly increased by lodgement of further objects in the openings thus created. Within a short time of installation portions of the side walls and conveyor pans are literally torn from the conveyor, such deterioration requiring conveyor replacement with undue frequency.

An object of this invention is to provide an endless conveyor with side walls, each side wall comprised of a succession of plates in end to end relationship, and having their adjacent ends respectively formed with convex and concave arcs having a common center to afford said plates relative articulation about said center.

A further object is to provide each plate with an extension, offset in a plane parallel to said plate and lapping an end portion of an adjacent plate to reinforce said portion against lateral bending.

A further object is to jointly pivotally engage said lapped extension and end portion with a pin about which said articulation occurs.

These and various other objects are attained in the construction hereinafter described and illustrated in the accompanying drawings, wherein:

Fig. 1 is a top plan view of the construction showing a portion of an upper, substantially horizontal span of a conveyor and side walls.

Fig. 2 is a fragmentary longitudinal vertical section of a conveyor and side wall showing articulation of the plates as the conveyor passes around a sprocket.

Fig. 3 is a top edge view showing a welded construction of a side wall plate.

Fig. 4 is a side view of such a plate showing the face thereof presented to a conveyor.

In these views the reference character 1 designates flat pans or plates disposed in endless succession. The opposite ends of the plates are respectively formed with hinge barrels 2 and 3, and the adjacent ends of the plates are pivotally joined by pins 4 inserted in such barrels, thus forming a continuous conveyor. The end portions of such pins journal rollers 5, and pivotally interconnect the end portions of links 6 of chains, disposed on each side of the conveyor. Each chain is designed to be mounted on a sprocket wheel 7 which may be rotatively driven by any suitable power source (not shown).

A succession of plates 8 is disposed at each side of the conveyor, to form a side wall and each plate is respectively positioned at an edge of a respective pan in a plane transverse to and intersected by the plane of such pan. The forward end 9 of each plate is pivotally engaged with one of said pins 4, and such end is formed with a convexly circular arc centered on the pivotal axis of said pin, and conforming to a concavely formed arc 9a on the rear end of the next preceding plate. This arrangement presents to the conveyor load substantially smooth unbroken inner wall faces.

On the outer face of each plate 8 at its rear end portion is welded a rectangular plate 10. Such plate extends rearwardly beyond the concavely arcuate rear end of the plate 8 to lap the front end portion of the next succeeding plate 8, and pivotally engage the pin 4 which mounts said portion. Such plate 9 strongly reinforces said front end portion against lateral bending, and further serves to support the rear end of the welded assembly.

As best seen in the upper span of the conveyor as illustrated in Fig. 2, the transverse relation of the plates 8 and 10 to the pans 1 leaves lower portions of said plates extending beneath such pans, which portions further increase the resistance of the plates to lateral bending. Where greater durability is desired, each plate may be welded to its associated pan 1, or otherwise secured thereto.

As clearly disclosed in Fig. 2, the construction affords relative articulation of the plates about the axes of the pins 4 as the conveyor passes over a sprocket wheel. The mated, arcuate, adjacent ends of the respective plates maintain a continuous inner surface of the wall even during such articulation. It is to be observed that the convexly arcuate front end 9 of each plate may be downwardly continued as at 11 to any extent necessary to prevent its lower edge from passing above the carrying surface of a pan during a desired degree of articulation. It is understood that the side wall plates may be formed in one piece by stamping rather than welding.

The illustrated closely fitting relation of the arcuately formed ends of the plates 8 will seldom be required. But even where a space is permissible between such ends, leaving a circularly arcuate slit therebetween, the lapping extension 10 prevents lateral escape of material from the conveyor. Further, any small or sharply pointed objects which might lodge in such an arcuate slit can gain no plate bending engagement behind the convexly formed front end 9 of the plates due to said extensions. In passing over the sprocket wheel 7, the arcuate ends articulate, sliding relative to any such aforementioned objects, which may drop freely from the conveyor, as intended.

It will readily be understood that the improved side wall hereinbefore described is not limited to use with the illustrated conveyor-belt, but is adaptable to any flexible-belt conveyor which provides or may be provided with pins 4 or their equivalent.

What I claim is:

1. An endless conveyor including a succession of flat pans in end-to-end relationship, pins pivotally interconnecting the adjacent ends of the pans, means including a revolubly mounted sprocket wheel for operably supporting said conveyor, said pans having substantially parallel edges, a side wall including a succession of substantially rectangular plates respectively elongated along the edge of the respective pans, each plate in a plane transverse to and intersected by the plane of such pan, each plate having a forward and rearward end, the rearward end portion being offset to lap the forward end portion of the succeeding plate, said lapped portions being pivotally engaged with one of said pins for relative articulation about said pin, the forward end of said plate having the form of a convexly circular arc closely conforming to a mating arc formed on the preceding plate to afford said articulation and present a substantially continuous unbroken wall face to said conveyor, said plates having substantially parallel longitudinal edges, the forward end of each plate having a portion protruding from one of said edges, and said convexly arcuate form being extended to said protruding portion, whereby said portion maintains said substantially unbroken wall face during travel of said conveyor about the axis of said sprocket wheel.

2. An endless conveyor including a flexible conveying element, means for operably supporting said element, a side wall including a succession of plates respectively disposed at an edge of said element, each plate having a forward and rearward end, the rearward end portion being offset to lap the forward end portion of the succeeding plate, means pivotally engaging said lapped portions for relative articulation about a pivotal axis, the forward end of said plate having the form of a convexly circular arc closely conforming to a mating arc formed on the preceding plate to afford said articulation and present a continuous substantially unbroken wall face to said conveying element, said plates having substantially longitudinal parallel edges, the forward end of each plate having a portion protruding from one of said edges, and said convexly arcuate form being extended to said protruding portion, whereby said portion maintains said substantially unbroken wall face during travel of said conveyor effecting said articulation of said plates.

References Cited in the file of this patent

UNITED STATES PATENTS

| 2,121,298 | Komarek | June 21, 1938 |
| 2,416,634 | McBride | Feb. 25, 1947 |
| 2,428,887 | Munro | Oct. 14, 1947 |

FOREIGN PATENTS

| 286,589 | Germany | Aug. 13, 1915 |